(12) United States Patent
Yasuta et al.

(10) Patent No.: US 10,131,396 B2
(45) Date of Patent: Nov. 20, 2018

(54) SADDLED VEHICLE

(71) Applicant: HONDA MOTOR CO., LTD., Minato-Ku, Tokyo (JP)

(72) Inventors: Nobuyoshi Yasuta, Wako (JP); Seitaro Kamei, Wako (JP); Hirotada Nishiyama, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/024,813

(22) PCT Filed: Sep. 30, 2013

(86) PCT No.: PCT/JP2013/076557
§ 371 (c)(1),
(2) Date: Mar. 24, 2016

(87) PCT Pub. No.: WO2015/045159
PCT Pub. Date: Apr. 2, 2015

(65) Prior Publication Data
US 2016/0229476 A1  Aug. 11, 2016

(51) Int. Cl.
*B62J 35/00* (2006.01)
*B62J 15/00* (2006.01)
(Continued)

(52) U.S. Cl.
CPC ............... *B62J 35/00* (2013.01); *B60K 13/02* (2013.01); *B62J 15/00* (2013.01); *B62J 37/00* (2013.01);
(Continued)

(58) Field of Classification Search
CPC ... B62J 35/00; B62J 15/00; B62J 37/00; B62J 99/00; B62K 11/04; B62K 13/02; B60K 2015/03514
See application file for complete search history.

(56) References Cited

U.S. PATENT DOCUMENTS

| | | | |
|---|---|---|---|
| 8,146,693 B2 * | 4/2012 | Oohashi | B60K 13/02 180/68.3 |
| 8,561,745 B2 * | 10/2013 | Inaoka | B62J 37/00 180/219 |

(Continued)

FOREIGN PATENT DOCUMENTS

| | | |
|---|---|---|
| CN | 1369624 A | 9/2002 |
| CN | 1460621 A | 12/2003 |

(Continued)

OTHER PUBLICATIONS

PCT/ISA/210 of PCT/JP2013/076557 in both English and Japanese.
(Continued)

*Primary Examiner* — Tony H Winner
*Assistant Examiner* — Gabriela C Craciun
(74) *Attorney, Agent, or Firm* — Carrier Blackman & Associates, P.C.; Joseph P. Carrier; Jingli Wang

(57) ABSTRACT

A saddled vehicle includes a rear fender that is arranged along an outer circumferential side of a rear wheel, a chamber portion that is arranged on a front side of the rear wheel and is provided on the outer circumferential side of the rear wheel from a mudguard surface of the rear fender facing the rear wheel, and an atmospheric air introduction pipe that is connected to the chamber portion and introduces atmospheric air to a canister.

5 Claims, 8 Drawing Sheets

(51) Int. Cl.

| | | |
|---|---|---|
| *B62J 37/00* | (2006.01) | |
| *F02M 25/08* | (2006.01) | |
| *B62J 99/00* | (2009.01) | |
| *B60K 13/02* | (2006.01) | |
| *B62K 11/04* | (2006.01) | |
| *F02M 19/06* | (2006.01) | |
| *F02M 35/16* | (2006.01) | |
| *B60K 15/035* | (2006.01) | |
| *B60K 15/03* | (2006.01) | |

(52) U.S. Cl.
CPC .............. *B62J 99/00* (2013.01); *B62K 11/04* (2013.01); *F02M 19/066* (2013.01); *F02M 25/089* (2013.01); *B60K 2015/03072* (2013.01); *B60K 2015/03514* (2013.01); *B60Y 2200/12* (2013.01); *F02M 25/0854* (2013.01); *F02M 35/162* (2013.01)

(56) References Cited

U.S. PATENT DOCUMENTS

| | | | |
|---|---|---|---|
| 9,162,728 B2 * | 10/2015 | Shiraishi | B62K 25/283 |
| 2008/0230030 A1 * | 9/2008 | Kawai | B62K 11/04 |
| | | | 123/184.21 |
| 2010/0051369 A1 * | 3/2010 | Kuramochi | B62J 35/00 |
| | | | 180/69.4 |
| 2010/0065362 A1 * | 3/2010 | Shimura | F02M 25/0854 |
| | | | 180/219 |
| 2010/0078241 A1 * | 4/2010 | Maeda | B62J 37/00 |
| | | | 180/68.3 |
| 2010/0242925 A1 * | 9/2010 | Yoshida | B62J 37/00 |
| | | | 123/519 |
| 2010/0243358 A1 * | 9/2010 | Suzuki | B62J 35/00 |
| | | | 180/219 |
| 2012/0199408 A1 * | 8/2012 | Hayashi | B62J 35/00 |
| | | | 180/219 |
| 2012/0247433 A1 * | 10/2012 | Ozaki | B62J 37/00 |
| | | | 123/519 |
| 2012/0312619 A1 * | 12/2012 | Inaoka | B60K 15/01 |
| | | | 180/219 |
| 2013/0061950 A1 * | 3/2013 | Inaoka | B62J 35/00 |
| | | | 137/351 |
| 2013/0075181 A1 * | 3/2013 | Ashida | B62J 37/00 |
| | | | 180/230 |
| 2013/0153319 A1 * | 6/2013 | Kawano | B60K 15/03006 |
| | | | 180/69.4 |
| 2013/0240281 A1 * | 9/2013 | Inaoka | B62J 37/00 |
| | | | 180/219 |
| 2013/0248270 A1 * | 9/2013 | Higashiyama | B62J 37/00 |
| | | | 180/225 |
| 2014/0060955 A1 * | 3/2014 | Kono | F02M 35/162 |
| | | | 180/291 |
| 2014/0339804 A1 * | 11/2014 | Nishiguchi | F02M 25/08 |
| | | | 280/835 |
| 2015/0101875 A1 * | 4/2015 | Inayama | B60K 13/02 |
| | | | 180/225 |

FOREIGN PATENT DOCUMENTS

| | | | |
|---|---|---|---|
| CN | 102016283 A | | 4/2011 |
| CN | 103182929 A | | 7/2013 |
| JP | 2011-011599 A | | 1/2011 |
| JP | 2011-195136 A | | 10/2011 |
| JP | 2012-076554 A | | 4/2012 |
| JP | 2012-162243 A | | 8/2012 |
| JP | 2013-067274 A | | 4/2013 |
| JP | 2013-075587 A | | 4/2013 |
| WO | 2013-094631 A1 | | 6/2013 |
| WO | WO2013/094631 | * | 6/2013 |

OTHER PUBLICATIONS

Office Action with English translation issued in the corresponding Chinese Patent Application 201380079863.6 dated Sep. 28, 2017.

* cited by examiner

SADDLED VEHICLE

TECHNICAL FIELD

The present invention relates to a saddled vehicle which includes a canister configured to collect evaporated fuel in a fuel tank.

BACKGROUND ART

Recently, in order to improve environmental performance, saddled vehicles provided with a canister which collects evaporated fuel in a fuel tank have come into wide use.

In addition to a charge tube through which the evaporated fuel in the fuel tank is collected and fed to the canister, a purge tube, an atmospheric air introduction pipe, and a drain tube are connected to the canister. The atmospheric air introduction pipe introduces atmospheric air (atmospheric pressure) into the canister when performing purging. The purge tube supplies a fuel-air mixture of atmospheric air introduced through the atmospheric air introduction pipe and evaporated fuel adsorbed by the canister, to an intake system of an engine. The drain tube discharges surplus moisture and the like to the outside.

It is not preferable that dust or moisture infiltrates into the canister from the outside. Patent Document 1 discloses a configuration in which a tip end of the atmospheric air introduction pipe (outside air introduction pipe) is thrust into a penetration hole which is provided in a cross pipe configuring a vehicle body. According to this configuration, it is possible to take and introduce relatively clean air from an inner space of the cross pipe into the canister.

Here, the cross pipe interlocks a pair of left and right pivot frames with each other which rockably support a front end portion of a rear fork supporting a rear wheel.

CITATION LIST

Patent Literature

[Patent Document 1] Japanese Unexamined Patent Application, First Publication No. 2011-11599

SUMMARY OF INVENTION

Technical Problem

Here, it is preferable that a charge tube, a purge tube, and an atmospheric air introduction pipe are as short as possible in order to prevent pressure loss and the like. Therefore, the lengths of the charge tube and the purge tube can be minimized by arranging a canister in the vicinity of a fuel tank or an intake system of an engine.

However, not all saddled vehicles have a cross pipe which is present in the vicinity of the canister which is arranged in the vicinity of the fuel tank or the intake system of the engine, and there may also be a case where there is no cross pipe. In such a case, in order to ensure that clean atmospheric air is introduced to the canister, sometimes the atmospheric air introduction pipe has to be lengthened, thereby resulting in problems such as an increase in pressure loss and the labor being required to install the atmospheric air introduction pipe. In addition, when a dedicated chamber is provided in the vicinity of the canister, the number of components and the man-hours required for assembly are increased.

The present invention has been made in consideration of the aforementioned circumstances, and an object thereof is to provide a saddled vehicle in which lengthening of the atmospheric air introduction pipe can be avoided and dust or moisture can be prevented from infiltrating into the canister.

Solution to Problem

As means for solving the above-described problems, a first aspect of the present invention includes a vehicle body frame, a fuel tank that is provided in the vehicle body frame and stores fuel, a canister that collects evaporated fuel generated in the fuel tank, a rear wheel that is arranged in a rear portion of the vehicle body frame, a rear fender that is arranged along an outer circumferential side of the rear wheel, a chamber portion that is arranged on a front side of the rear wheel and is provided on the outer circumferential side with respect to a mudguard surface of the rear fender facing the rear wheel, and an atmospheric air introduction pipe that is connected to the chamber portion and introduces atmospheric air to the canister.

In a second aspect of the present invention according to the first aspect, the chamber portion has a side wall portion extending upward from a bottom surface portion of the chamber portion and is open upward.

A third aspect of the present invention according to the second aspect further includes an engine accessory component that is arranged in front of the rear fender and a bottom portion of the engine accessory component is arranged so as to face the top of the chamber portion.

In a fourth aspect of the present invention according to the third aspect, the vehicle body frame includes a pair of sub-pipes which are arranged on both sides in a vicinity of a front portion of the rear fender in a vehicle body width direction. The pair of sub-pipes are arranged between an upper end portion of the side wall portion and the engine accessory component.

In a fifth aspect of the present invention according to the fourth aspect, the rear fender includes engagement portions which protrude outward in the vehicle body width direction from the side wall portions being positioned on both sides in the chamber portion in the vehicle body width direction and engage with the pair of sub-pipes.

In a sixth aspect of the present invention according to the fifth aspect, the engine accessory component is an air cleaner case. The air cleaner case has an attachment portion which fixes the air cleaner case to the pair of sub-pipes.

A seventh aspect of the present invention according to the sixth aspect further includes an engine that is mounted in a front portion of the vehicle body frame and includes a cylinder which extends obliquely upward to the front from a crank case, the fuel tank that is arranged above the engine, and a fuel supply device that is arranged in a rear of the cylinder and feeds the cylinder with air having passed through the air cleaner case and fuel supplied from the fuel tank. The canister is arranged above the crank case and in the rear of the cylinder. The chamber portion is arranged between the engine and the rear wheel.

An eighth aspect of the present invention according to any one of the second aspect to the seventh aspect further includes a side stand that is provided on one side of the vehicle body frame in the vehicle body width direction. The chamber portion includes a drain hole which is formed on one side of the bottom surface portion provided with the side stand in the vehicle body width direction and the atmospheric air introduction pipe of the canister is connected to the other side thereof in the vehicle body width direction.

Advantageous Effects of Invention

According to the first aspect, the chamber portion is arranged on the outer circumferential side of the mudguard surface of the rear fender. Therefore, it is possible to ensure a space in which water or dust is unlikely to enter. The atmospheric air introduction pipe is connected to the chamber portion. Therefore, it is possible to avoid lengthening of the atmospheric air introduction pipe, it is possible to prevent dust or moisture from infiltrating into the canister, and it is possible to introduce clean air to the canister. In addition, the chamber portion is provided in the rear fender. Therefore, in contrast to a case where a dedicated chamber is provided in the vicinity of the canister, it is possible to prevent the number of components and the man-hours required for assembly from increasing.

According to the second aspect, the chamber portion is caused to have a shape which is open upward. Therefore, it is easy to perform form removal when performing resin molding of the chamber portion together with the rear fender. Accordingly, it is possible to easily manufacture the rear fender including the chamber portion.

According to the third aspect, the bottom portion of the air cleaner case faces an opening portion of the chamber portion which is open upward. Therefore, it is possible to prevent foreign substances such as dust and water from invading the inside of the chamber portion from the outside.

According to the fourth aspect, the sub-pipe is arranged. Therefore, it is possible to prevent foreign substances such as dust and water from invading the inside of the chamber portion from the outside through a gap between the upper end portion of the side wall portion and the air cleaner case.

According to the fifth aspect, the front portion of the rear fender is fixed to the vehicle body frame. Therefore, it is possible to omit a structure for fastening the rear fender to the vehicle body frame on the front side of the rear fender. As a result, it is possible to easily and efficiently perform attachment work of the rear fender.

According to the sixth aspect, the rear fender including the chamber portion, and the air cleaner case can be fixed to the sub-pipes, that is, fixed to the same components. Therefore, it is easy to ensure the positional accuracy of the chamber portion and the air cleaner case.

According to the seventh aspect, the canister is arranged above a crank case and in the rear of the cylinder, and the chamber portion is arranged between the rear wheel and the engine. Therefore, it is possible to shorten the lengths of the purge tube, the charge tube, and the atmospheric air introduction pipe connecting the canister to each of the components.

According to the eighth aspect, when a saddled vehicle is parked in a state of being propped against the ground on the side stand and tilting toward the side stand side, a drain hole is positioned at the bottom of the chamber portion in a tilt direction. Therefore, it is easy to drain the chamber portion at the time of parking. Moreover, the atmospheric air introduction pipe is positioned above the chamber portion in the tilt direction. Therefore, even when water invades the inside of the chamber portion, it is possible to reduce the possibility of permeation of water into the canister.

DESCRIPTION OF EMBODIMENTS

Figure 1:
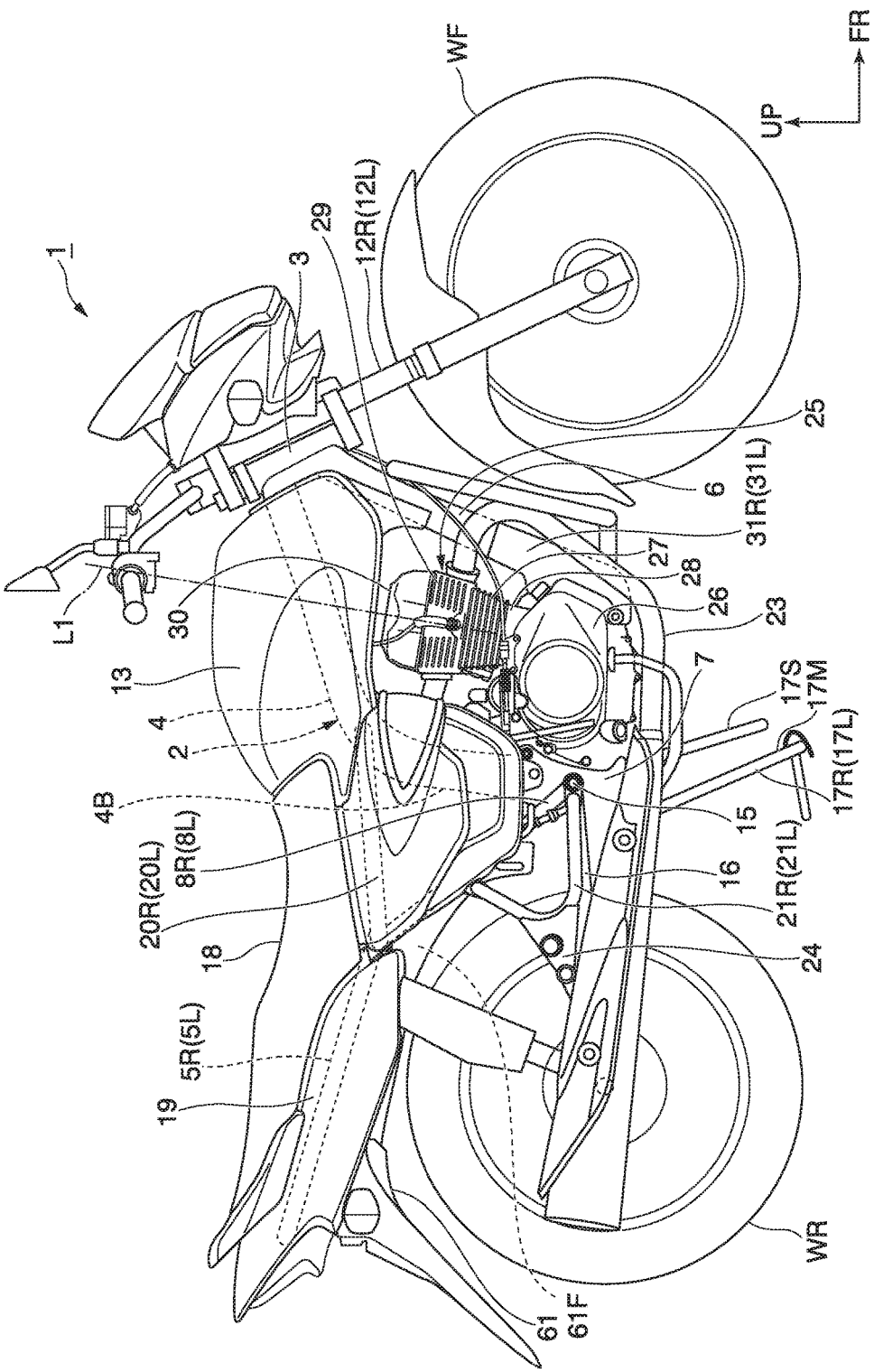
FIG. 1 is a right side view of a motorcycle according to an embodiment of the present invention.

Hereinafter, an embodiment of the present invention will be described on the basis of the drawings. In the drawings used in the following description, the arrow FR indicates the front of a vehicle, the arrow UP indicates the upward direction of the vehicle, and the arrow LH indicates the left side of the vehicle.

Figure 2:
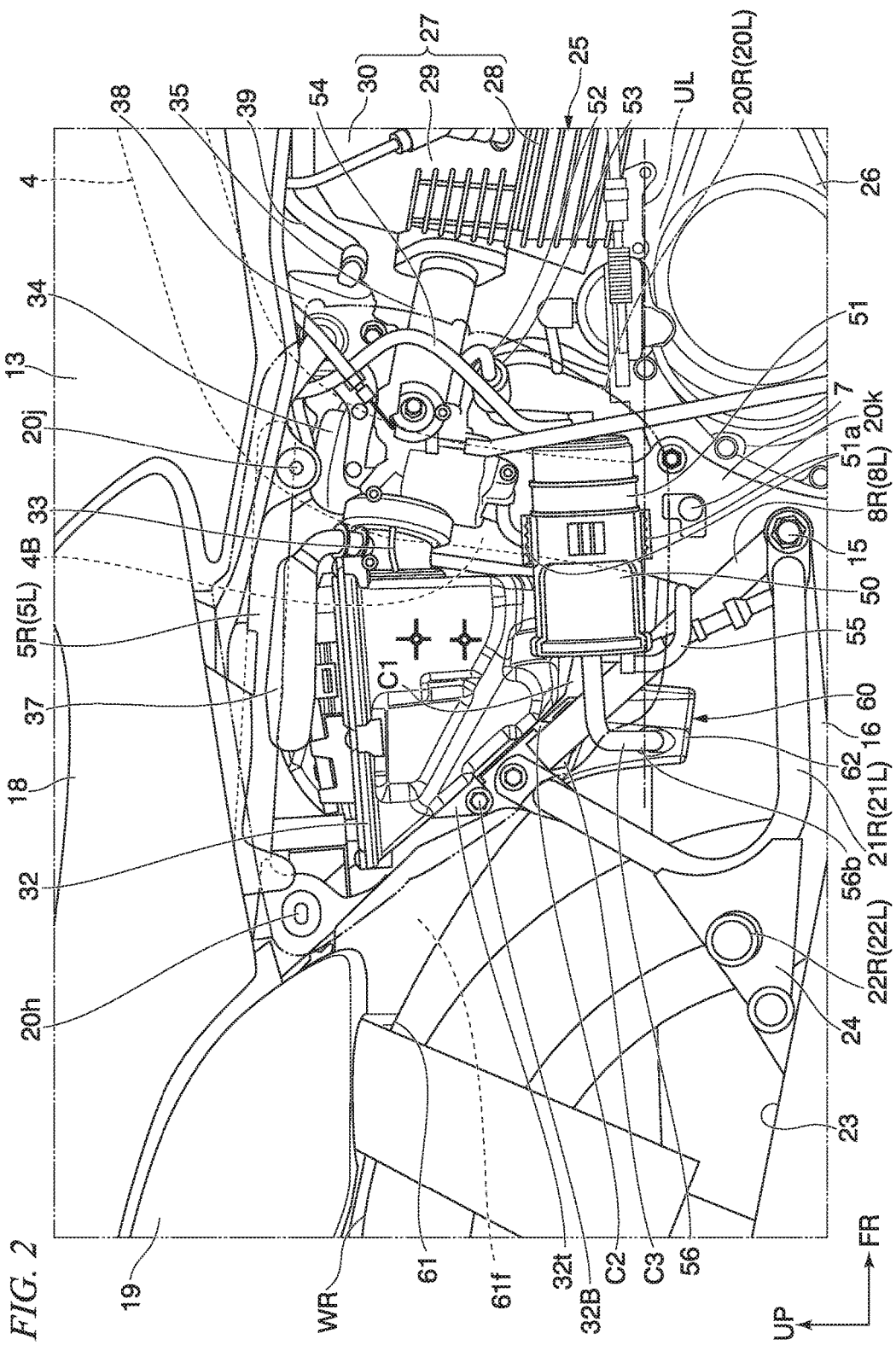
FIG. 2 is a diagram illustrating a configuration around a canister of the motorcycle, and is a right side view of a state where a side cover is detached.

FIG. 1 is a right side view of a motorcycle 1 according to the embodiment of the present invention. FIG. 2 is a diagram illustrating a configuration around a canister 50 of the motorcycle 1, and is a right side view of a state where side covers 20L and 20R are detached.

As illustrated in FIG. 1, a vehicle body frame 2 of the motorcycle 1 which is a saddled vehicle according to the embodiment of the present invention includes a head pipe 3, a main frame 4, rear frames 5L and 5R, a down frame 6, a pivot bracket 7, and sub-pipes 8L and 8R.

The head pipe 3 is configured to be a front end of the vehicle body frame 2. A pair of left and right front forks 12L and 12R rotatably supporting a front wheel WF which is arranged in front of the vehicle body frame 2 are rotatably attached to a lower portion of the head pipe 3 via a steering shaft (not illustrated).

The main frame 4 extends obliquely downward to the rear from an upper portion of the head pipe 3, and a rear portion 4B thereof is curved downward by changing the angle. A fuel tank 13 which stores fuel is arranged above the main frame 4.

The pair of left and right rear frames 5L and 5R extend toward the rear from the rear portion 4B of the main frame 4. The down frame 6 extends obliquely downward to the rear from the lower portion of the head pipe 3. The pivot bracket 7 extends downward from the rear portion 4B of the main frame 4.

As illustrated in FIGS. 1 and 2, the sub-pipes 8L and 8R extend obliquely upward to the rear from the pivot bracket 7 and are respectively connected to substantially central positions of the rear frames 5L and 5R in a forward-rearward direction.

The reference numeral and sign of the member which is not depicted in the drawings (for example, the rear frame 5L) among the above-described members is indicated in parentheses in the drawings for convenience of description. In the following description, the member which is not depicted in the drawings may be handled in a similar manner.

A swing arm 16 having the divaricated front end is provided in the pivot bracket 7 so as to interpose the pivot bracket 7 therebetween. The swing arm 16 is supported by a pivot bolt 15 which extends in a vehicle body width direction (transverse direction) so as to vertically and freely swing with respect to the pivot bracket 7. A rear end portion of the swing arm 16 rotatably supports a rear wheel WR which is arranged in the rear of the vehicle body frame.

A main stand 17M and a side stand 17S are independently and rotatably supported by a lower end portion of the pivot bracket 7.

The main stand 17M supports the vehicle body frame 2 in an upright state and includes a pair of two stand legs 17L and 17R which are spaced apart from each other in the vehicle body width direction.

The side stand 17S is provided on the left side in the vehicle body width direction. When a tip end portion of the side stand 17S is propped against the ground, the motorcycle 1 is supported in a state of tilting to the left in the vehicle body width direction.

A seat 18 which extends in the forward-rearward direction is supported on the rear frames 5L and 5R.

Moreover, a tail cover 19 which covers the rear frames 5L and 5R at the lower portion of the seat 18 is supported by the rear frames 5L and 5R.

In the lower portion of the seat 18 on both sides in the vehicle body width direction, the side covers 20L and 20R (refer to FIG. 1) which individually cover accessories such as an air cleaner case 32 (refer to FIG. 2) described later are provided in an attachable/detachable manner. In order to mount the side covers 20L and 20R, as illustrated in FIG. 2, engagement holes 20h and 20j are formed in the lower end portion to the rear of the rear frames 5L and 5R and the fuel tank 13. In addition, a bolt hole (not illustrated) through which a bolt 20k can be fastened is formed in the pivot bracket 7. In the side covers 20L and 20R, engagement protrusions (not illustrated) which are provided in the upper portions on the rear surfaces of the side covers 20L and 20R are inserted into the engagement holes 20h and 20j so as to engage therewith. Moreover, in the side covers 20L and 20R, the bolt 20k is fastened to the bolt hole of the pivot bracket 7 through a bolt insertion hole (not illustrated) provided in the lower end portion thereof. In this manner, the side covers 20L and 20R is fixed to the vehicle body frame 2.

Brackets 21L and 21R extending downward and rearward are respectively provided in the sub-pipes 8L and 8R. Pillion steps 22L and 22R for a rear seat are supported by the brackets 21L and 21R.

As illustrated in FIG. 1, a single cylinder air-cooled engine 25 is mounted in a front portion of the vehicle body frame 2 below the fuel tank 13 and the main frame 4. The engine 25 includes a crank case 26 which accommodates engine oil, and a cylinder 27 which stands upright from the front portion of the crank case 26. The cylinder 27 includes a cylinder block 28 in which a piston is slidably accommodated in a cylinder bore formed inside the cylinder block 28, a cylinder head 29 which is arranged in the upper portion of the cylinder block 28, and a head cover 30 which covers the upper portion of the cylinder head 29.

The reference numeral and sign L1 in the drawings indicate a cylinder axial line which is a central axis of the cylinder bore inside the cylinder block 28. The cylinder axial line L1 slightly tilts with respect to the perpendicular direction and extends upward to the front from the crank case 26 side. In the present embodiment, the cylinder axial line L1 extends substantially along the extending direction of the down frame 6.

The crank case 26 accommodates a crank shaft and a transmission. The front portion of the crank case 26 of the engine 25 is supported via a pair of left and right front crank case hangers 31L and 31R which are fixedly attached to the down frame 6 so as to extend to the rear from side surfaces of the lower portion of the down frame 6. In addition, a rear portion of the crank case 26 of the engine 25 is supported by the pivot bracket 7, thereby being supported by the vehicle body frame 2.

The front end of an exhaust muffler 23 is connected to an exhaust port (not illustrated) which is formed in the cylinder block 28 of the engine 25. The rear portion of the exhaust muffler 23 is connected to a muffler bracket 24 which is provided in a bracket 21R.

As illustrated in FIG. 2, the air cleaner case 32 is arranged in a space between the rear frames 5L and 5R and the sub-pipes 8L and 8R below the front portion of the seat 18. The upper portion of the air cleaner case 32 is suitably supported by the rear frames 5L and 5R. In addition, an attachment portion 32t for fixing the air cleaner case 32 to the sub-pipes 8L and 8R is formed to the rear portion of the air cleaner case 32. The bolt insertion hole (not illustrated) is formed in the attachment portion 32t. The air cleaner case 32 is fixed to the sub-pipes 8L and 8R by inserting a bolt 32B into the bolt insertion hole and screwing the bolt 32B to the screw hole (not illustrated) which is fastened to the sub-pipes 8L and 8R.

The air cleaner case 32 and the cylinder 27 are connected to each other through an air intake duct 33, a fuel supply device 34, and an inlet pipe 35 so as to communicate with each other. In addition, a resonator 37 is connected to the air intake duct 33.

An intake system of the motorcycle 1 is configured to include the air cleaner case 32, the air intake duct 33, the fuel supply device 34, and the inlet pipe 35. In the intake system, intake air flows from the air cleaner case 32 side toward the cylinder 27 side. Hereinafter, regarding the flow of intake air, the air cleaner case 32 side may be referred to as the upstream side, and the cylinder 27 side may be referred to as the downstream side.

The air intake duct 33 extends forward from the front surface of the air cleaner case 32, thereby being connected to the fuel supply device 34. The fuel supply device 34 is connected to the fuel tank 13 through a fuel hose (not illustrated) so that fuel is supplied thereto. The fuel supply device 34 is arranged in the rear of the cylinder 27 and mixes air which has passed through the air cleaner case 32 with fuel which has supplied from the fuel tank 13, and feeds to the engine 25.

In the present embodiment, the fuel supply device 34 is a carburetor. However, the fuel supply device may be configured to include a throttle body having a throttle valve, and an injector. In this case, the injector may be integrated with the throttle body or may be a separate body arranged to be apart from the throttle body. In addition, in the present embodiment, the inlet pipe 35 is directly connected to the fuel supply device 34. However, the inlet pipe 35 may be connected via an insulator.

A breather purge control valve (hereinafter, referred to as BPCV) 38 is arranged above the fuel supply device 34 and the inlet pipe 35. The BPCV 38 is provided in an intermediate portion of a breather pipe 39 which connects a breather chamber (not illustrated) which is formed in the cylinder 27 to the air cleaner case 32.

The BPCV 38 is equipped with a solenoid and is opened and closed by operating the solenoid in response to a command of a vehicle control device which is arranged in a suitable place in the vehicle. As the BPCV 38 is open, blow-by gas and the like generated inside the engine 25 and guided to a breather chamber 27S are introduced to the air cleaner case 32. In the present embodiment, the solenoid of the BPCV 38 is controlled by the vehicle control device. Accordingly, in the motorcycle 1, the BPCV 38 is opened and closed so as to be able to adjust a return amount of the blow-by gas and the like. The return amount of the blow-by gas and the like can be adjusted so as to be increased or decreased by changing the opening-closing interval of the solenoid in accordance with the engine speed, for example.

The canister 50 is arranged at a place which is lower than the air intake duct 33, the fuel supply device 34, and the inlet pipe 35 while being higher than the top surface of the crank case 26 (indicated by the line UL in FIG. 2). The canister 50 is formed to have a cylinder shape and is arranged so as to cause a center axial direction thereof to be oriented in the forward-rearward or longitudinal direction of the body of the motorcycle 1. The canister 50 is arranged on the right side in the vehicle body width direction, for example, with respect to the pivot bracket 7.

Figure 3:
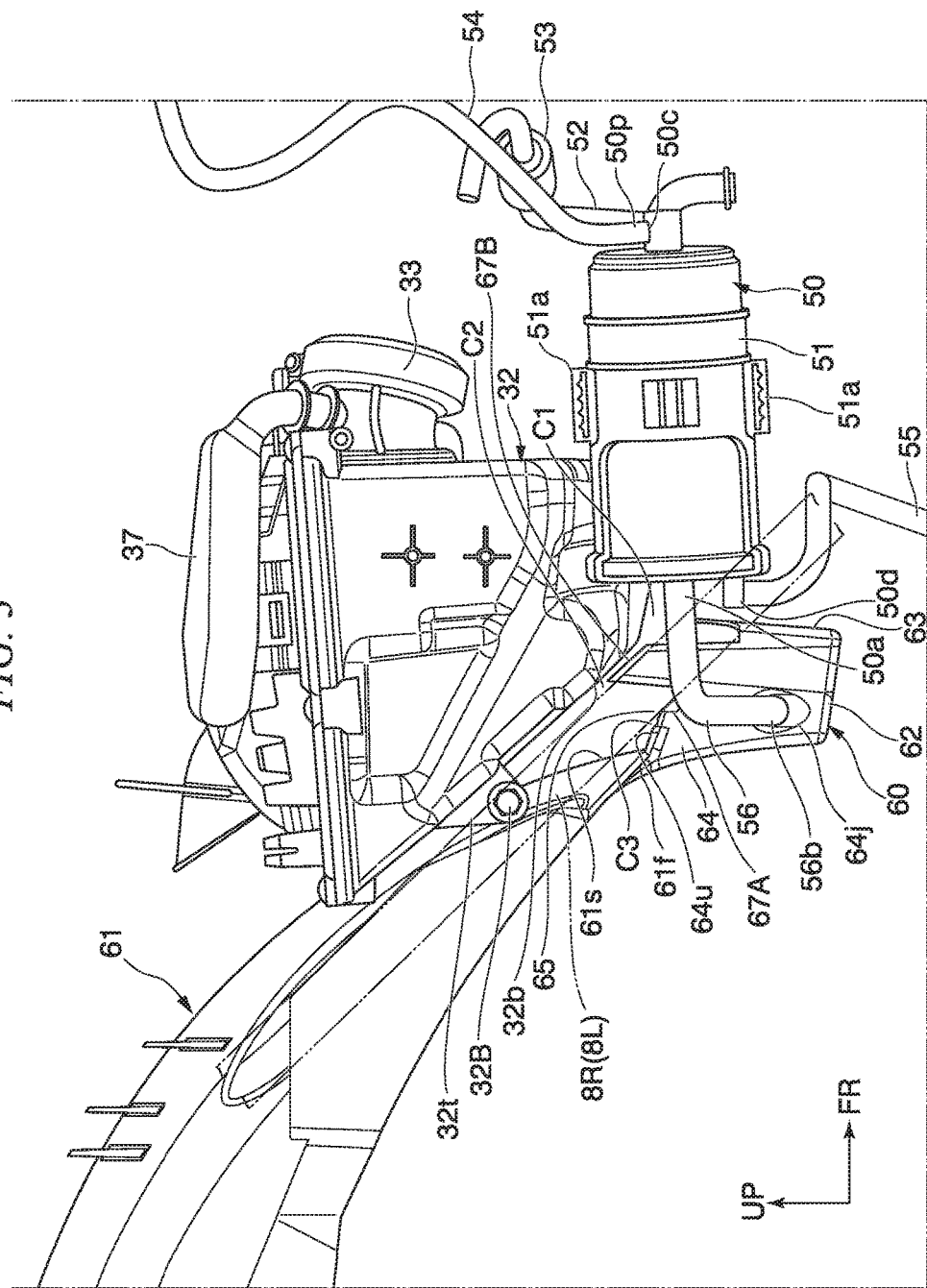
FIG. 3 is a right side view illustrating an arrangement configuration of main components in the periphery of the canister.
Figure 4:
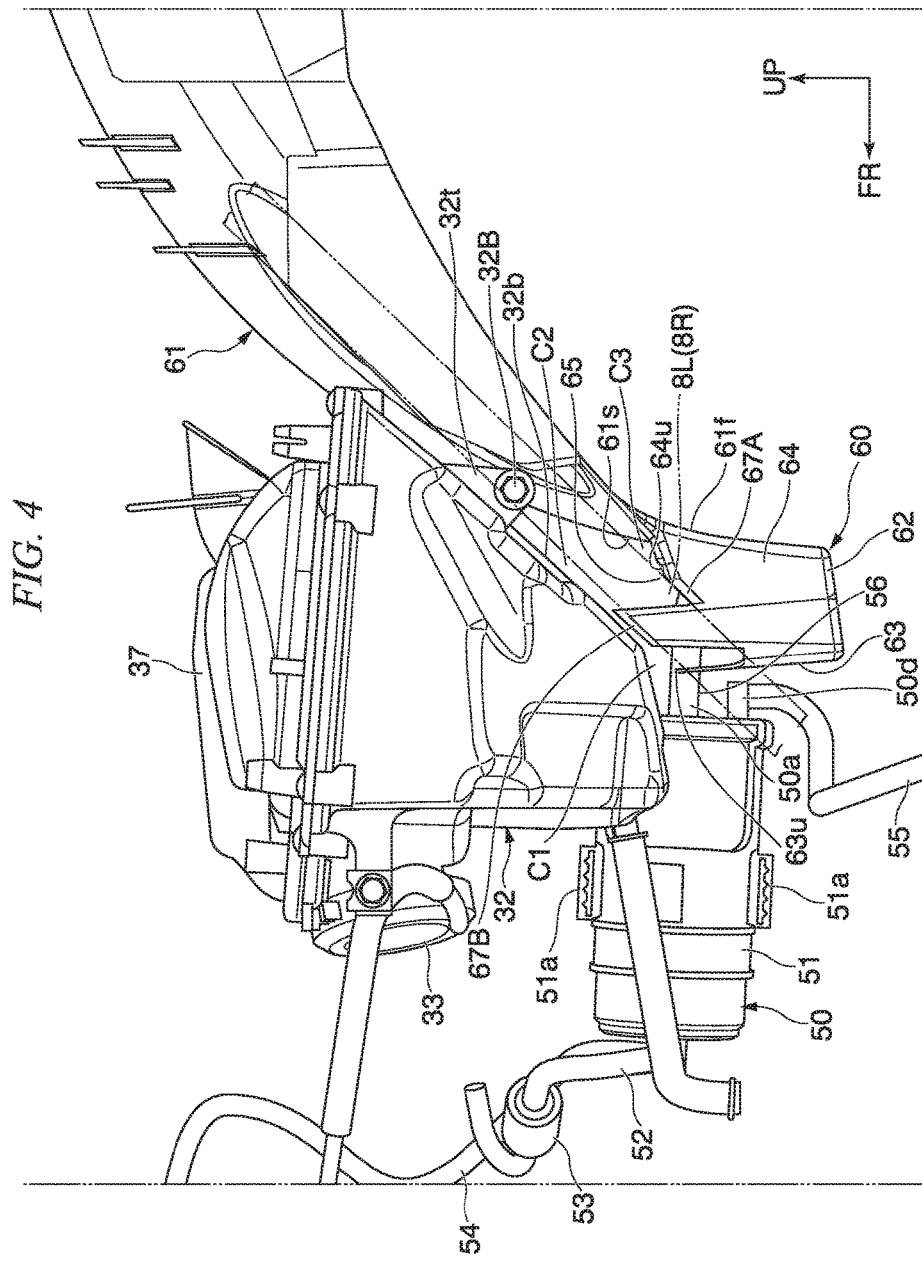
FIG. 4 is a left side view illustrating the arrangement configuration of the main components in the periphery of the canister.
Figure 5:
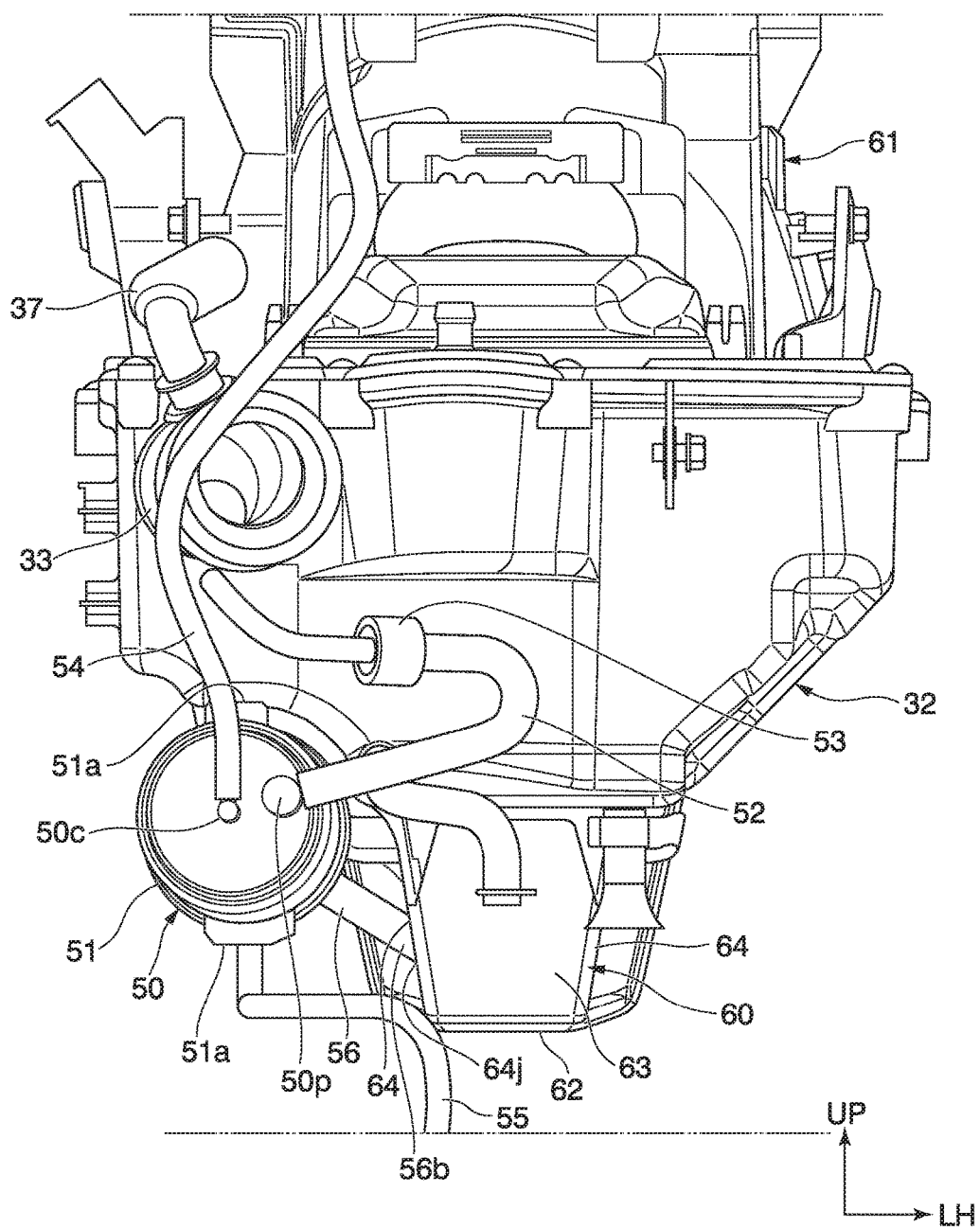
FIG. 5 is a diagram of the arrangement configuration of the main components in the periphery of the canister viewed from the front of a vehicle.
Figure 6:
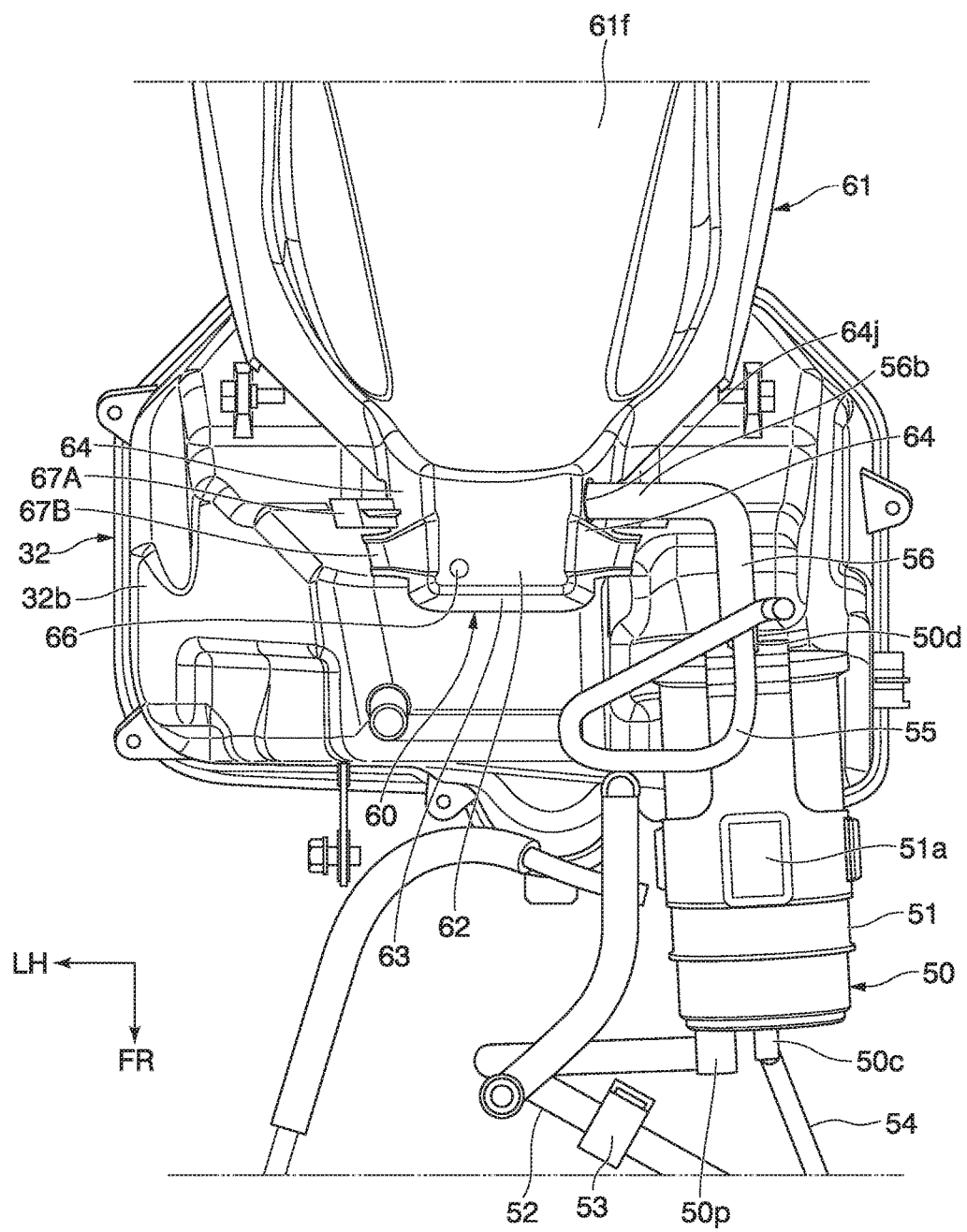
FIG. 6 is a diagram of the arrangement configuration of the main components in the periphery of the canister viewed from below.

FIG. 3 is a right side view illustrating an arrangement configuration of main components in the periphery of the canister 50. FIG. 4 is a left side view illustrating the arrangement configuration of the main components in the periphery of the canister 50. FIG. 5 is a diagram of the arrangement configuration of the main components in the periphery of the canister 50 viewed from the front of the vehicle. FIG. 6 is a diagram of the arrangement configuration of the main components in the periphery of the canister 50 viewed from below.

As illustrated in FIGS. 3 to 6, the canister 50 is inserted into a substantially tubular retention member 51 which is made from an elastic member such as a rubber-based material. A pair of stay insertion portions 51a protruding toward the outer circumferential side of the canister 50 in a radial direction are formed in the retention member 51. The canister 50 is attached to the pivot bracket 7 as a support stay (not illustrated) fixed to the pivot bracket 7 (refer to FIG. 1) is inserted into the stay insertion portions 51a.

In the canister 50, a built-in adsorbent such as activated carbon can adsorb evaporated fuel. An end portion pointing the front of the canister 50 includes a purge port 50p which supplies evaporated fuel to the intake system and a charge port 50c which introduces the evaporated fuel from the fuel tank 13. In addition, an end portion pointing the rear the canister 50 includes a drain port 50d for discharging fuel stored inside thereof, water droplets, and the like, and an atmospheric air opening port 50a which is open to the atmospheric air. The drain port 50d is positioned so as to be lower than the atmospheric air opening port 50a.

A purge tube 52 is connected to the purge port 50p of the canister 50. The other end of the purge tube 52 is connected to the inlet pipe 35, for example, in the intake system. Then, a canister purge control valve (hereinafter, CPCV) 53 is provided in an intermediate portion of the purge tube 52.

The CPCV 53 is arranged above the top surface of the crank case 26 and forward from the canister 50. The CPCV 53 in the present embodiment is equipped with a solenoid and is opened and closed by operating the solenoid in response to a command of a vehicle control device which is arranged in a suitable place in the vehicle. The CPCV 53 introduces evaporated fuel from the canister 50 toward the inlet pipe 35 side. In the motorcycle 1, the CPCV 53 is opened and closed so as to be able to adjust a return amount of the evaporated fuel. The return amount of the evaporated fuel can be adjusted so as to be increased or decreased by changing the opening-closing interval of the solenoid in accordance with the engine speed, for example.

A charge tube 54 is connected to the charge port 50c of the canister 50. The other end of the charge tube 54 is drawn out upward from the canister 50 and is inserted into the fuel tank 13.

A drain tube 55 is connected to the drain port 50d of the canister 50. The drain tube 55 is drawn out downward from the canister 50 and the other end of the drain tube 55 is open downward.

An atmospheric air introduction pipe 56 is connected to the atmospheric air opening port 50a of the canister 50. The other end 56b of the atmospheric air introduction pipe 56 is connected to a chamber portion 60 described later.

As illustrated in FIGS. 1 and 2, in the motorcycle 1 of the present embodiment, a rear fender 61 is provided on substantially the outer circumferential side of the upper half portion of the rear wheel WR. A side of the rear fender 61 facing the rear wheel WR serves as a mudguard surface 61f which receives and stops mud or water splashing from the rear wheel WR.

Figure 7:
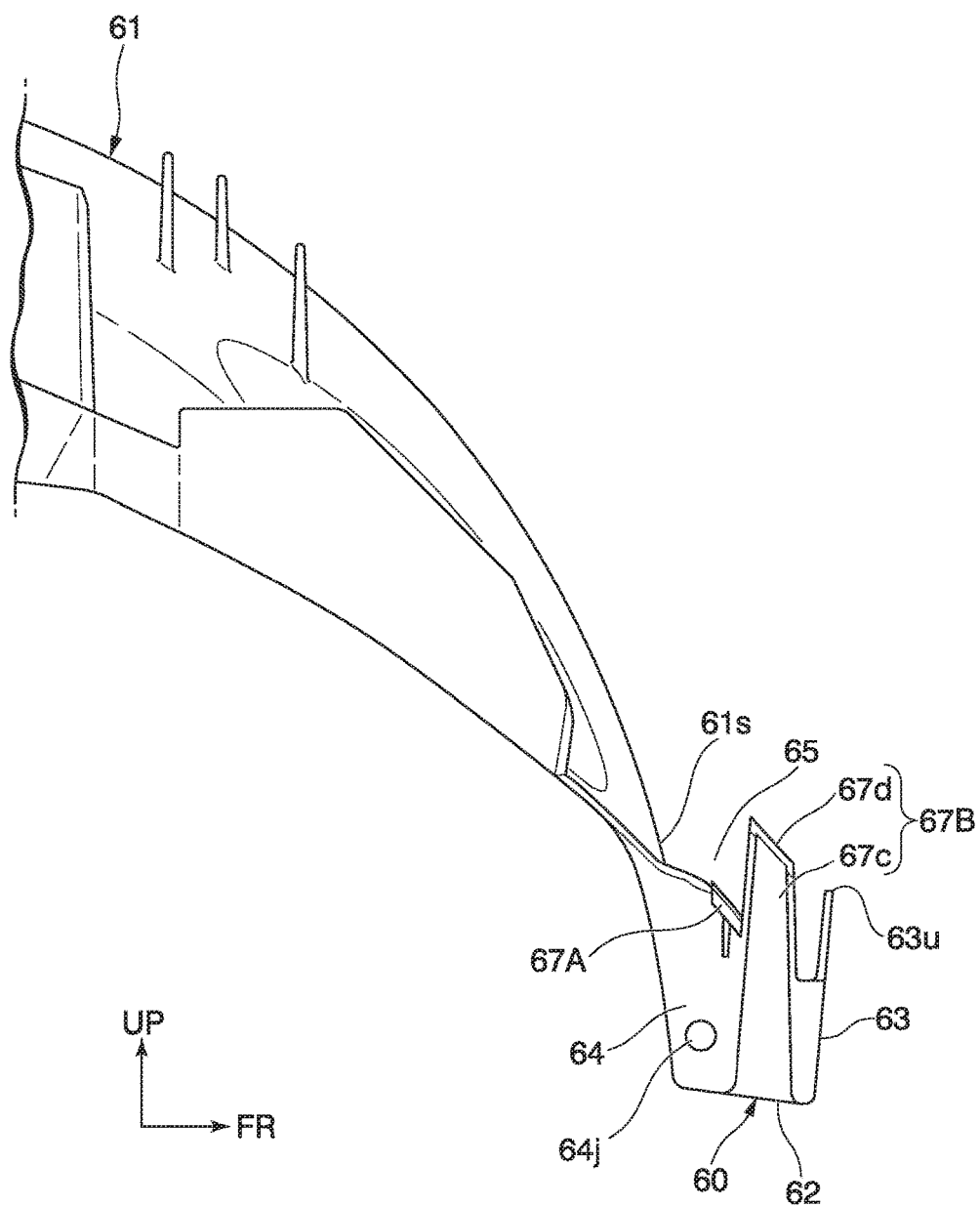
FIG. 7 is a right side view of a rear fender provided in the vicinity of the canister.
Figure 8:
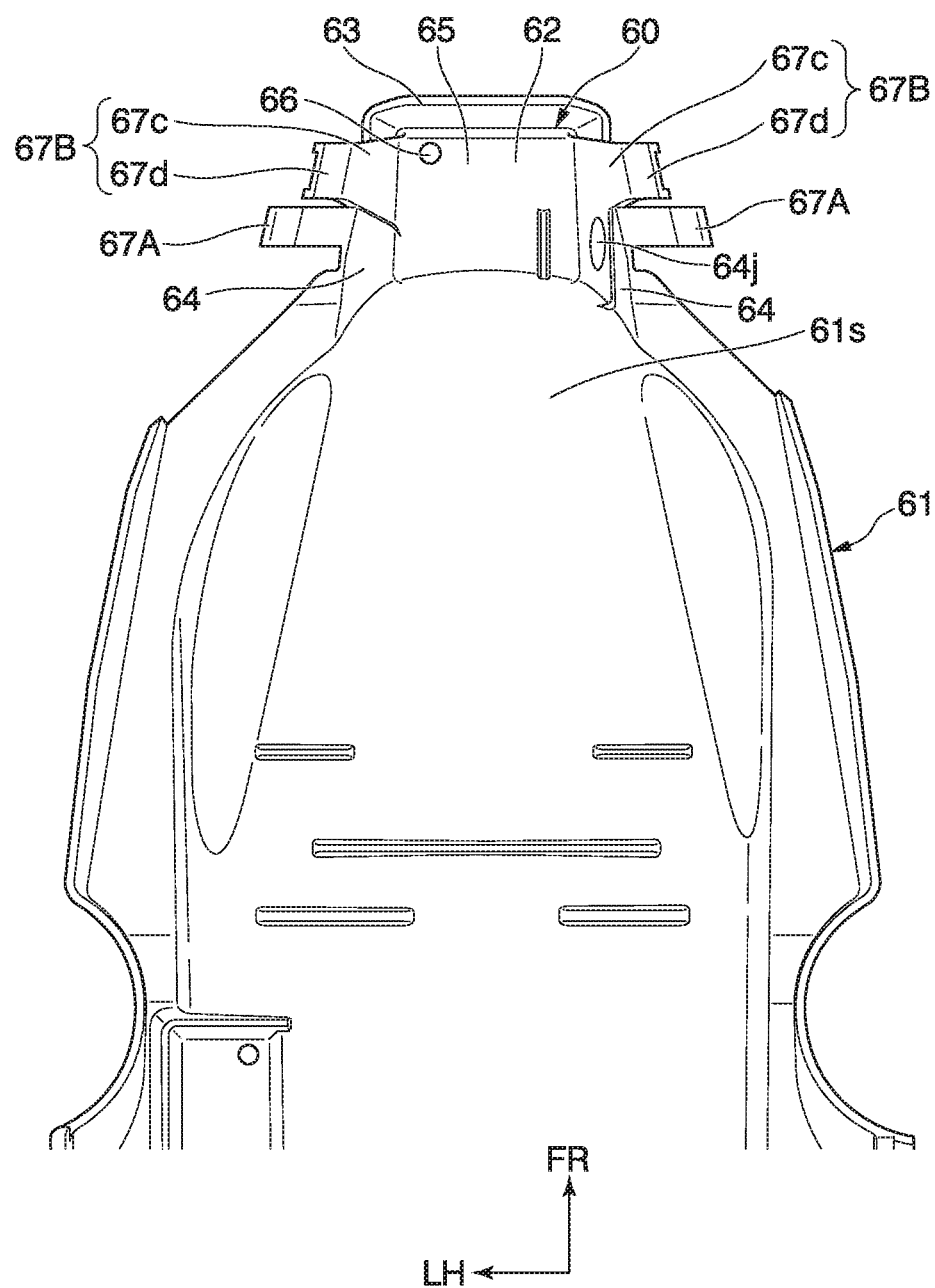
FIG. 8 is a diagram of a front portion of the rear fender viewed from above.

FIG. 7 is a right side view of the rear fender 61 provided in the vicinity of the canister 50. FIG. 8 is a diagram of the front portion of the rear fender 61 viewed from above.

As illustrated in FIGS. 2 to 8, the chamber portion 60 is formed in the front end portion of the rear fender 61. Accordingly, the chamber portion 60 is arranged between the engine 25 and the rear wheel WR. The chamber portion 60 is provided so as to protrude from the mudguard surface 61f of the rear fender 61 facing the rear wheel WR toward the outer circumferential side of the rear wheel WR.

As illustrated in FIGS. 3 to 8, the chamber portion 60 includes a bottom surface portion 62 which is formed by extending from the rear fender 61 toward the outer circumferential side in the horizontal direction, a front wall portion (side wall portion) 63 which extends upward from the front end portion of the bottom surface portion 62, and lateral wall portions (side wall portions) 64 which respectively extend upward from the side end portions on both sides of the bottom surface portion 62 in the vehicle body width direction.

The rear end side of the bottom surface portion 62 continues to an outer circumferential surface portion 61s of the rear fender 61. The outer circumferential surface portion 61s forms the mudguard surface 61f on the rear wheel WR side thereof. The lateral wall portions 64 are formed so as to continue to the outer circumferential surface portion 61s of the rear fender 61 and the front wall portion 63. Accordingly, all the sides of the bottom surface portion 62 of the chamber portion 60 are surrounded by the front wall portion 63, the lateral wall portions 64, and the outer circumferential surface portion 61s of the rear fender 61. In other words, the chamber portion 60 has a cup-like shape having an opening portion 65 which is open upward.

The other end 56b of the atmospheric air introduction pipe 56 is connected to a connection port 64j, which is formed in the lateral wall portion 64. The other end 56b of the atmospheric air introduction pipe 56 is thrust into the connection port 64j from obliquely above on the right, thereby being retained therein.

As illustrated in FIGS. 6 and 8, a drain hole 66 which discharges water and the like which has invaded the inside of the chamber portion 60 is formed so as to penetrate the bottom surface portion 62.

Here, the bottom surface portion 62 downwardly tilts at the front thereof, and the drain hole 66 is formed in the bottom surface portion 62 in the front end of one side (left side) in the vehicle body width direction where the side stand 17S is provided. In addition, in the chamber portion 60, the atmospheric air introduction pipe 56 is connected to the connection port 64j which is provided in the rear on the other side (right side) which is a side opposite to the side in the vehicle body width direction where the side stand 17S is provided.

As illustrated in FIGS. 2 to 6, the chamber portion 60 is arranged below the air cleaner case 32 which is arranged in the front of the rear fender 61. Accordingly, a bottom portion 32b of the air cleaner case 32 is arranged above the opening portion 65 of the chamber portion 60 so as to face the bottom portion 32b. Here, as illustrated in FIGS. 3 and 4, the front wall portion 63 of the chamber portion 60 is formed so as to protrude further upward than the lateral wall portions 64. An upper end portion 63u of the front wall portion 63 is arranged while having a gap C1 in the vertical direction with respect to the bottom portion 32b of the air cleaner case 32. Due to the gap C1, outside air can be introduced into the chamber portion 60 from between the upper end portion 63u of the front wall portion 63 of the chamber portion 60 and the bottom portion 32b of the air cleaner case 32.

A pair of the sub-pipes 8L and 8R of the vehicle body frame 2 are arranged on both sides in the vicinity of the front portion of the rear fender 61 in the vehicle body width direction so as to interpose the center of the vehicle body therebetween. Then, the pair of sub-pipes 8L and 8R are arranged between an upper end portion 64u of the lateral wall portions 64 of the chamber portion 60 and the air cleaner case 32.

In the lateral wall portions 64 on both sides in the chamber portion 60 in the vehicle body width direction, two engagement claws (the engagement portions) 67A and 67B protruding outward in the vehicle body width direction are formed. As illustrated in FIGS. 7 and 8, the engagement claw 67A on one side is formed so as to protrude outward in the vehicle body width direction from the upper end portion of the lateral wall portion 64 while being orthogonal to the lateral wall portions 64. The engagement claw 67B on the other side is arranged at a front position of the vehicle body closer than the engagement claw 67A. The engagement claw 67B is formed to include an extension portion 67c which extends upward from the upper end portion of the lateral wall portion 64, and a claw portion 67d which protrudes outward in the vehicle body width direction from the upper end of the extension portion 67c. As illustrated in FIGS. 3 and 4, the engagement claw 67A and the claw portion 67d of the engagement claw 67B are respectively arranged along one side (bottom surface side) and the other side (top surface side) while interposing the sub-pipes 8L and 8R therebetween. Then, as the sub-pipes 8L and 8R are fitted between the engagement claw 67A and the claw portion 67d of the engagement claw 67B, the front end portion of the rear fender 61 engages with the sub-pipes 8L and 8R. In other words, the engagement claws 67A and 67B function as the engagement portions on the front side of the rear fender 61.

Here, a gap C2 is formed between the top surface sides of the sub-pipes 8L and 8R and the bottom portion 32b of the air cleaner case 32. In addition, a gap C3 is formed between the bottom surface sides of the sub-pipes 8L and 8R and the upper end portions of the lateral wall portions 64 as well. Outer air can be introduced into the chamber portion 60 through the gaps C2 and C3.

As illustrated in FIG. 2, the side covers 20L and 20R are arranged so as to cover the chamber portion 60, the air cleaner case 32 which is arranged in the vicinity thereof, and the gaps C1 to C3 which are formed between the sub-pipes 8L and 8R. Accordingly, outer air is introduced into the chamber portion 60 through the gaps C1 to C3 from a space on the rear side of the side covers 20L and 20R.

The canister 50 provided in the above-described manner introduces evaporated fuel inside the fuel tank 13 through the charge tube 54. In the canister 50, the adsorbent adsorbs fuel from the introduced evaporated fuel. The cleaned air after the fuel is adsorbed is released to the outside of the chamber portion 60 via the atmospheric air introduction pipe 56.

The canister 50 supplies evaporated fuel stored in the canister 50 to the intake system when the CPCV 53 is opened on the basis of controlling of the vehicle control device. In this case, intake negative pressure generated as a result of an operation of the piston inside the cylinder 27 is utilized. A fuel-air mixture of the atmospheric air which is introduced from the chamber portion 60 via the atmospheric air introduction pipe 56 and evaporated fuel which is stored in the canister 50 is drawn into the purge tube 52. The fuel-air mixture including the evaporated fuel which has drawn into the purge tube 52 is drawn into the cylinder 27 through the inlet pipe 35 of the intake system of the motorcycle 1, thereby being combusted in the engine 25.

As disclosed above, the motorcycle 1 according to the present embodiment includes the rear fender 61 which is arranged along the rear wheel WR, the chamber portion 60 which is arranged in front of the rear wheel WR and is provided on the outer circumferential side with respect to the mudguard surface 61f of the rear fender 61 facing the rear wheel WR, and the atmospheric air introduction pipe 56 which is connected to the chamber portion 60 and introduces the atmospheric air to the canister 50.

In this manner, since the chamber portion 60 is arranged on the outer circumferential side of the mudguard surface 61f of the rear fender 61, it is possible to ensure a space in which water or dust is unlikely to enter. The atmospheric air introduction pipe 56 is connected to the chamber portion 60. Therefore, it is possible to avoid lengthening of the atmospheric air introduction pipe 56, and it is possible to introduce clean air to the canister 50. In addition, the chamber portion 60 is formed integrally with the rear fender 61. Therefore, in contrast to a case where a dedicated chamber is provided in the vicinity of the canister 50, it is possible to reduce the number of components and the man-hours required for assembly from increasing.

In the motorcycle 1 according to the present embodiment, the chamber portion 60 includes the front wall portion 63 and the lateral wall portions 64 extending upward from the bottom surface portion 62 of the chamber portion 60, and the chamber portion 60 is open upward.

In this manner, the chamber portion 60 is caused to have a shape which is open upward. Therefore, it is possible to easily perform form removal when performing resin molding of the chamber portion 60 together with the rear fender 61, and it is possible to easily manufacture the rear fender 61.

The motorcycle 1 according to the present embodiment further includes the air cleaner case 32 which is arranged in front of the rear fender 61 and of which the bottom portion 32b is arranged so as to face the top of the chamber portion 60.

The bottom portion 32b of the air cleaner case 32 faces the opening portion 65 of the chamber portion 60 which is open upward. Therefore, it is possible to prevent foreign substances such as dust and water from invading the inside of the chamber portion 60 from the outside.

In the motorcycle 1 according to the present embodiment, the vehicle body frame 2 includes the pair of sub-pipes 8L and 8R which are respectively arranged on both sides in the vicinity of the front portion of the rear fender 61 in the vehicle body width direction. The pair of sub-pipes 8L and 8R are arranged between the upper end portions 64u of the lateral wall portions 64 and the air cleaner case 32.

As the sub-pipes 8L and 8R are arranged, it is possible to prevent foreign substances such as dust and water from invading the inside of the chamber portion 60 from the outside through a gap between the upper end portion 64u of the lateral wall portions 64 and the air cleaner case 32.

In the motorcycle 1 according to the present embodiment, the rear fender 61 includes the engagement claws 67A and 67B which respectively protrude outward in the vehicle body width direction from the lateral wall portions 64 being positioned on both sides in the chamber portion 60 in the vehicle body width direction and respectively engage with the pair of sub-pipes 8L and 8R.

Accordingly, the front portion of the rear fender 61 is fixed to the vehicle body frame 2. Therefore, it is possible to omit a structure for fastening the rear fender 61 to the vehicle body frame 2 on the front side thereof. As a result thereof, it is possible to easily and efficiently perform attachment work of the rear fender 61.

In the motorcycle 1 according to the present embodiment, the air cleaner case 32 is provided with the attachment portion 32t which fixes the air cleaner case 32 to the sub-pipes 8L and 8R with which the chamber portion 60 engages by using the engagement claws 67A and 67B.

Accordingly, the rear fender 61 including the chamber portion 60, and the air cleaner case 32 can be fixed to the sub-pipes 8L and 8R, that is, to the same component. Therefore, it is possible to easily ensure the positional accuracy of the chamber portion 60 and the air cleaner case 32.

As an engine accessory component which is arranged so as to face the opening portion 65 of the chamber portion 60, other components such as a battery tray can be employed, for example. However, the air cleaner case 32 has a degree of freedom in shape more flexible than that of other components. Accordingly, the bottom portion 32b of the air cleaner case 32 can easily conform to the shape of the chamber portion 60.

The motorcycle 1 according to the present embodiment includes the engine 25 that is mounted in the front portion of the vehicle body frame 2 and includes the cylinder 27 which extends obliquely upward to the front from the crank case 26, the fuel tank 13 that is arranged above the engine 25, and the fuel supply device 34 that is arranged in the rear of the cylinder 27 and feeds the engine 25 with air which has passed through the air cleaner case 32 and has been mixed with fuel supplied from the fuel tank 13. The canister 50 is arranged above the crank case 26 and in the rear of the cylinder 27. The chamber portion 60 is arranged between the engine 25 and the rear wheel WR.

In this manner, the canister 50 is arranged above the crank case 26 and in the rear of the cylinder 27, and the chamber portion 60 is arranged between the rear wheel WR and the engine 25. Therefore, it is possible to shorten the lengths of the purge tube 52, the charge tube 54, and the atmospheric air introduction pipe 56 connecting the canister 50 and each of the components.

The motorcycle 1 according to the present embodiment further includes the side stand 17S that is provided on one side of the vehicle body frame 2 in the vehicle body width direction. The chamber portion 60 includes the drain hole 66 which is formed on one side of the bottom surface portion 62 provided with the side stand 17S in the vehicle body width direction and the atmospheric air introduction pipe 56 of the canister 50 is connected to the other side thereof in the vehicle body width direction.

Accordingly, when the motorcycle 1 is parked in a state of being propped against the ground on the side stand 17S and tilting toward the side stand 17S side, the drain hole 66 is positioned at the bottom of the chamber portion 60 in the tilt direction. Therefore, it is easy to drain the chamber portion 60 at the time of parking. Moreover, the atmospheric air introduction pipe 56 is positioned above the chamber portion 60 in the tilt direction. Therefore, even when water invades the inside of the chamber portion 60, it is possible to reduce the possibility of permeation of water into the canister 50.

The present invention is not limited to the embodiment described above with reference to the drawings, and it is possible to consider various modification examples within the technical scope thereof.

For example, the above-described embodiment includes all the vehicles on which a driver rides by straddling the vehicle body. The vehicle includes not only the motorcycle (including a motorized bicycle and a scooter-type vehicle) but also a three-wheel vehicle (in addition to a vehicle having one front wheel and two rear wheels, a vehicle having two front wheels and one rear wheel is included) and a four-wheel vehicle.

The engine is not limited to the single cylinder engine, and the invention may also be applied to a multi-cylinder engine.

In the above-described embodiment, the fuel supply device 34 is a carburetor. However, the fuel supply device may be configured to include the throttle body having the throttle valve, and the injector. In this case, description is given that the injector may be a separate body arranged to be apart from the throttle body. However, in this case, more specifically, the injector may be provided in an inlet pipe or the like.

The configuration of the above-described embodiment is an example of the present invention, and various changes can be made without departing from the scope of the gist of the invention.

INDUSTRIAL APPLICABILITY

As an atmospheric air introduction pipe is connected to a chamber portion which is provided on an outer circumferential side of a mudguard surface of a rear fender in front of a rear wheel, lengthening of the atmospheric air introduction pipe can be avoided, dust or moisture can be prevented from infiltrating into a canister, and clean air can be introduced to the canister.

REFERENCE SIGNS LIST

1 MOTORCYCLE (SADDLED VEHICLE)
2 VEHICLE BODY FRAME
5L, 5R REAR FRAME
7 PIVOT BRACKET
8L, 8R SUB-PIPE
13 FUEL TANK
17S SIDE STAND
20L, 20R SIDE COVER
25 ENGINE
26 CRANK CASE
27 CYLINDER

32 AIR CLEANER CASE
32b BOTTOM PORTION
32t ATTACHMENT PORTION
33 AIR INTAKE DUCT
34 FUEL SUPPLY DEVICE
35 INLET PIPE
36 FUEL HOSE
50 CANISTER
50a ATMOSPHERIC AIR OPENING PORT
50c CHARGE PORT
50d DRAIN PORT
50p PURGE PORT
52 PURGE TUBE
54 CHARGE TUBE
55 DRAIN TUBE
56 ATMOSPHERIC AIR INTRODUCTION PIPE
60 CHAMBER PORTION
61 REAR FENDER
61f MUDGUARD SURFACE
61s OUTER CIRCUMFERENTIAL SURFACE PORTION
62 BOTTOM SURFACE PORTION
63 FRONT WALL PORTION (SIDE WALL PORTION)
63u UPPER END PORTION
64 LATERAL WALL PORTION (SIDE WALL PORTION)
64j CONNECTION PORT
65 OPENING PORTION
66 DRAIN HOLE
67A, 67B ENGAGEMENT CLAW (ENGAGEMENT PORTION)
67c EXTENSION PORTION
67d CLAW PORTION
WF FRONT WHEEL
WR REAR WHEEL

The invention claimed is:

1. A saddled vehicle comprising:
a vehicle body frame;
a fuel tank that is provided on the vehicle body frame and stores fuel;
a canister that collects evaporated fuel generated in the fuel tank;
a rear wheel that is arranged in a rear portion of the vehicle body frame;
a rear fender that is arranged along an outer circumferential side of the rear wheel;
a chamber portion that is arranged on a front side of the rear wheel and is provided on the outer circumferential side with respect to a mudguard surface of the rear fender facing the rear wheel; and
an atmospheric air introduction pipe that is connected to the chamber portion and introduces atmospheric air to the canister,
wherein the chamber portion has a side wall portion extending upward from a bottom surface portion of the chamber portion and is open upward,
wherein the saddled vehicle further includes an engine accessory component that is arranged in front of the rear fender and a bottom portion of the engine accessory component is arranged so as to face the top of the chamber portion,
wherein the vehicle body frame includes a pair of sub-pipes which are arranged on both sides in a vicinity of a front portion of the rear fender in a vehicle body width direction,
wherein the pair of sub-pipes are arranged between an upper end portion of the side wall portion and the engine accessory component so as to cover a gap between the side wall portion and the engine accessory component in a side view, and
wherein a center longitudinal axis of the canister is oriented in a vehicle body longitudinal direction.

2. The saddled vehicle according to claim 1,
wherein the rear fender includes engagement portions which protrude outward in the vehicle body width direction from the side wall portions being positioned on both sides in the chamber portion in the vehicle body width direction and engage with the pair of sub-pipes.

3. The saddled vehicle according to claim 2,
wherein the engine accessory component is an air cleaner case, and
wherein the air cleaner case has an attachment portion which fixes the air cleaner case to the pair of sub-pipes.

4. The saddled vehicle according to claim 3, further comprising:
an engine that is mounted in a front portion of the vehicle body frame and includes a cylinder which extends obliquely upward to the front from a crank case;
the fuel tank that is arranged above the engine; and
a fuel supply device that is arranged in a rear of the cylinder and feeds the cylinder with air having passed through the air cleaner case and fuel supplied from the fuel tank,
wherein the canister is arranged above the crank case and in the rear of the cylinder, and
wherein the chamber portion is arranged between the engine and the rear wheel.

5. The saddled vehicle according to claim 2, further comprising:
a side stand that is provided on one side of the vehicle body frame in the vehicle body width direction,
wherein the chamber portion includes a drain hole which is formed on one side of the bottom surface portion provided with the side stand in the vehicle body width direction and the atmospheric air introduction pipe of the canister is connected to the other side thereof in the vehicle body width direction.

* * * * *